(12) United States Patent
Teyeb et al.

(10) Patent No.: US 8,675,604 B2
(45) Date of Patent: Mar. 18, 2014

(54) RELAY ENHANCED CELLULAR TELECOMMUNICATION NETWORK

(75) Inventors: Oumer Teyeb, Stockholm (SE); Bernhard Raaf, Neuried (DE); Weihua Zhou, Beijing (CN)

(73) Assignee: Nokia Siemens Networks Oy, Espoo (FI)

(*) Notice: Subject to any disclaimer, the term of this patent is extended or adjusted under 35 U.S.C. 154(b) by 122 days.

(21) Appl. No.: 13/136,782

(22) Filed: Aug. 10, 2011

(65) Prior Publication Data

US 2012/0039299 A1 Feb. 16, 2012

Related U.S. Application Data

(60) Provisional application No. 61/401,323, filed on Aug. 10, 2010.

(51) Int. Cl.
*H04W 4/00* (2009.01)

(52) U.S. Cl.
USPC .......................................................... 370/331

(58) Field of Classification Search
USPC ......... 370/203, 204–215, 229–240, 310–337, 370/338–350, 351–394, 395.1, 395.3, 370/395.4, 395.41, 395.42, 395.5, 395.52, 370/431–457, 458–463, 464–497, 498–529
See application file for complete search history.

(56) References Cited

U.S. PATENT DOCUMENTS

| | | | | |
|---|---|---|---|---|
| 8,311,541 | B2 * | 11/2012 | Yano et al. | 455/436 |
| 8,331,224 | B2 * | 12/2012 | Meirosu et al. | 370/229 |
| 2010/0184432 | A1 * | 7/2010 | Yano et al. | 455/435.1 |
| 2010/0322193 | A1 * | 12/2010 | Hu et al. | 370/331 |
| 2011/0122779 | A1 * | 5/2011 | Meirosu et al. | 370/252 |
| 2011/0153844 | A1 * | 6/2011 | Bovo et al. | 709/228 |
| 2012/0202491 | A1 * | 8/2012 | Fox et al. | 455/435.1 |
| 2012/0269168 | A1 * | 10/2012 | Qiu | 370/331 |
| 2012/0327908 | A1 * | 12/2012 | Gupta et al. | 370/331 |

OTHER PUBLICATIONS

"3rd Generation Partnership Project; Technical Specification Group Services and System Aspects; General Packet Radio Service (GPRS) enhancements for Evolved Universal Terrestrial Radio Access Network (E-UTRAN) access (Release 9)", 3GPP TS 23.401 V9.5.0, Jun. 2010, 259 pgs.

(Continued)

*Primary Examiner* — Jung-Jen Liu
(74) *Attorney, Agent, or Firm* — Harrington & Smith

(57) ABSTRACT

Systems and techniques for avoiding inefficiencies resulting from failed handover attempts. A base station selects one or more mobility management entity (MME) pools for assignment to a relay node, with the selection being performed so as to minimize or eliminate handover attempts requiring that a target device support a particular MME pool when the MME pool is not supported by the MME. A base station selects, when communicating with a relay node, a subset of the MME pools that it supports and assigns the subset to the base station. UEs served by the relay node are assigned the MME pool or MME pools assigned to the relay node. The relay node is informed of the MME pools supported by one or more neighbor nodes and, when attempting a handover to a neighbor node, attempts an X2 handover only to neighbor nodes supporting an MME pool assigned to the relay node.

20 Claims, 7 Drawing Sheets

(56) References Cited

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP TS 36.300 V8.11.0, Dec. 2009, 148 pgs.

"3rd Generation Partnership Project Technical Specification Group Radio Access Network Evolved Universal Terrestrial Radio Access (E-UTRA) and Evolved Universal Terrestrial Radio Access Network (E-UTRAN) Overall description; Stage 2 (Release 9)", 3GPP TS 36.300 V9.3.0, Mar. 2010, 166 pgs.

"3rd Generation Partnership Project; Technical Specification Group Radio Access Network; Evolved Universal Terrestrial Radio Access Network (E-UTRAN); x2 application protocol (X2AP) (Release 9)", 3GPP TS 36.423, V9.3.0, Jun. 2010, 121 pgs.

"3rd Generation Partnership Project; Technical Specification Group Radio Access Network; Evolved Universal Terrestrial Radio Access (E-UTRA); Relay architectures for E-UTRA (LTE-Advanced) (Release 9)", 3GPP TR 36.806, V9.0.0, Mar. 2010, 34 pgs.

"3rd Generation Partnership Project; Technical Specification Group Radio Access Network; Feasibility study for Further Advancements for E-UTRA (LTE-Advanced) (Release 9)", 3GPP. TR 36.912, V9.2.0, Mar. 2010, 61 pgs.

"3rd Generation Partnership Project; Technical Specification Group Radio Access Network; Requirements for further advancements for Evolved Universal Terrestrial Radio Access (E-UTRA) (LTE-Advanced) (Release 9)", 3GPP TR 36.913, V9.0.0, Dec. 2009, 15 pgs.

Zte, 3GPP TSG-RAN3 Meeting #68, R3-101537, "The GU Group ID transmission on X2 Setup Procedure", Montreal, Canada, May 10-14, 2010, 4 pages.

Nokia Siemens Networks, 3GPP TSG-RAN WG3 Meeting RAN3#69bis, R3-103544, "Handover type determination for relay", Jacksonville, USA, Oct. 15-19, 2010, 4 pages.

Nokia Siemens Networks, 3GPP TSG-RAN WG3 Meeting RAN3#69bis, R3-102808, "HO type determination", Xi'an, China, 11,h—Oct. 15, 2010, 3 pages.

Huawei, 3GPP TSG-RAN WG3 AH, R3-101867, "Consideration on HO type choosing issue", Jun. 29-Jul. 1, 2010, Beijing, China, 3 pages.

Huawei et al., 3GPP TSG-RAN WG2 Meeting #70bis, R2-103707, "On the selection of RN's MME", Stockholm, Sweden, Jun. 28-Jul. 2, 2010, 3 pages.

Zte, 3GPP TSG RAN WG3 # adhoc, R3-101896, "GU Group id and HO type", Jun. 29-Jul. 1, Beijing, China, 2 pages.

Motorola et al., 3GPP TSG-RAN WG3 AdHoc, draft_R3-101965, "Handling of neighboring info and choice of HO type", Beijing, China, Jun. 29-Jul. 1, 2010, 1 page.

\* cited by examiner

RELAY ENHANCED CELLULAR TELECOMMUNICATION NETWORK

CROSS REFERENCE TO RELATED APPLICATIONS

This application claims priority from U.S. Provisional Patent Application No. 61/401,323, filed on Aug. 10, 2010, which is hereby incorporated herein by reference in its entirety.

TECHNICAL FIELD

The exemplary and non-limiting embodiments of this invention relate generally to wireless communication systems, methods, devices and computer programs and, more specifically, relate to user equipment handovers initiated by relay nodes attached to donor base stations.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:
3GPP third generation partnership project
BS base station
BW bandwidth
CN core network
DeNB donor eNB (donor base station)
DL downlink (eNB towards UE)
eNB E-UTRAN Node B (evolved Node B), a base station
EPC evolved packet core
E-UTRAN evolved UTRAN (LTE)
FDMA frequency division multiple access
GU globally unique
GUMMEI globally unique MME identifier
HO handover
HSPA high speed packet access
HATA international mobile telecommunications association
ITU-R international telecommunication union-radiocommunication sector
LTE long term evolution of UTRAN (E-UTRAN)
LTE-A LTE advanced
MAC medium access control (layer 2, L2)
MME mobility management entity
NodeB base station
OFDMA orthogonal frequency division multiple access
O&M operations and maintenance
PDCP packet data convergence protocol
PHY physical (layer 1, L1)
RAN radio access network
Rel release
RLC radio link control
RN relay node
RRC radio resource control
RRM radio resource management
SGW serving gateway
SC-FDMA single carrier, frequency division multiple access
UE user equipment, such as a mobile station, mobile node or mobile terminal
UL uplink (UE towards eNB)
UPE user plane entity
UTRAN universal terrestrial radio access network One modern communication system is known as evolved UTRAN (E-UTRAN, also referred to as UTRAN-LTE or as E-UTRA). In this system the DL access technique is OFDMA, and the UL access technique is SC-FDMA.

One specification of interest is 3GPP TS 36.300, V8.11.0 (2009-12), 3rd Generation Partnership Project; Technical Specification Group Radio Access Network; Evolved Universal Terrestrial Radio Access (E-UTRA) and Evolved Universal Terrestrial Access Network (EUTRAN); Overall description; Stage 2 (Release 8), incorporated by reference herein in its entirety. This system may be referred to for convenience as LTE Rel-8. In general, the set of specifications given generally as 3GPP TS 36.xyz (e.g., 36.211, 36.311, 36.312, etc.) may be seen as describing the Release 8 LTE system. More recently, Release 9 versions of at least some of these specifications have been published including 3GPP TS 36.300, V9.3.0 (2010-03).

FIG. 1A reproduces Figure 4.1 of 3GPP TS 36.300 V8.11.0, and shows the overall architecture of the EUTRAN system (Rel-8). The E-UTRAN system includes eNBs, providing the E-UTRAN user plane (PDCP/RLC/MAC/PHY) and control plane (RRC) protocol terminations towards the UEs. The eNBs are interconnected with each other by means of an X2 interface. The eNBs are also connected by means of an S1 interface to an EPC, more specifically to a MME by means of a S1 MME interface and to a S-GW by means of a S1 interface (MME/S-GW 4). The S1 interface supports a many-to-many relationship between MMEs/S-GWs/UPEs and eNBs.

The eNB hosts the following functions:
functions for RRM: RRC, Radio Admission Control, Connection Mobility Control, Dynamic allocation of resources to UEs in both UL and DL (scheduling);
IP header compression and encryption of the user data stream;
selection of a MME at UE attachment;
routing of User Plane data towards the EPC (MME/S-GW);
scheduling and transmission of paging messages (originated from the MME);
scheduling and transmission of broadcast information (originated from the MME or O&M); and
a measurement and measurement reporting configuration for mobility and scheduling.

Of particular interest herein are the further releases of 3GPP LTE (e.g., LTE Rel-10) targeted towards future IMTA systems, referred to herein for convenience simply as LTE-Advanced (LTE-A). Reference in this regard may be made to 3GPP TR 36.913, V9.0.0 (2009-12), 3rd Generation Partnership Project; Technical Specification Group Radio Access Network; Requirements for Further Advancements for E-UTRA (LTE-Advanced) (Release 9). Reference can also be made to 3GPP TR 36.912 V9.2.0 (2010-03) Technical Report 3rd Generation Partnership Project; Technical Specification Group Radio Access Network; Feasibility study for Further Advancements for E-UTRA (LTE-Advanced) (Release 9).

A goal of LTE-A is to provide significantly enhanced services by means of higher data rates and lower latency with reduced cost. LTE-A is directed toward extending and optimizing the 3GPP LTE Rel-8 radio access technologies to provide higher data rates at lower cost. LTE-A will be a more optimized radio system fulfilling the ITU-R requirements for EMT-Advanced while keeping the backward compatibility with LTE Rel-8.

As is specified in 3GPP TR 36.913, LTE-A should operate in spectrum allocations of different sizes, including wider spectrum allocations than those of LTE Rel-8 (e.g., up to 100 MHz) to achieve the peak data rate of 100 Mbit/s for high mobility and 1 Gbit/s for low mobility. It has been agreed that carrier aggregation is to be considered for LTE-A in order to support bandwidths larger than 20 MHz. Carrier aggregation, where two or more component carriers (CCs) are aggregated, is considered for LTE-A in order to support transmission bandwidths larger than 20 MHz. The carrier aggregation could be contiguous or non-contiguous. This technique, as a bandwidth extension, can provide significant gains in terms of peak data rate and cell throughput as compared to non-aggregated operation as in LTE Rel-8.

Relay nodes (RNs) have been proposed as coverage extensions in cellular systems. The use of relay mechanisms can contribute to meeting the goal of coverage extension, and can also achieve a number of other benefits. Examples of such benefits are provisioning of high-bit-rate coverage in a high shadowing environment; reducing average radio transmission power at the User Equipment (UE), thereby leading to increased battery life; enhancing cell capacity and effective throughput—for example, increasing cell-edge capacity and balancing cell load—and enhancing the overall performance of the RAN and reducing deployment costs of the RAN.

FIG. 1B illustrates an exemplary deployment scenario of an LTE RAN with radio relayed extensions. As shown in FIG. 1B, those UEs at disadvantaged positions, such as the cell edge and/or in high shadowing areas, may be connected to a DeNB (donor base station) via the RN.

SUMMARY OF THE INVENTION

According to an embodiment of the invention, a method comprises configuring an apparatus to perform actions comprising sending a globally unique group identifier list to a device. Sending of the globally unique group identifier list to the device is performed upon one or more of initial association with the device or a configuration update for the device. If the device is a relay node associated with the apparatus, including in the globally unique group identifier list is a subset of MME pool identifiers associated with the apparatus. The MME pool identifiers included in the subset are chosen so as to exclude MME pool identifiers that are unsupported by one or more neighbor nodes of the device.

In another embodiment of the invention, a non-transitory computer-readable medium stores a program of instructions, execution of which by at least one data processor of a donor eNB causes operations comprising selecting a single MME pool for all UEs connected to a specified relay node associated with the donor eNB and communicating the identity of the selected MME pool to the specified relay node.

In another embodiment of the invention, a method comprises configuring a relay node operating in an LTE wireless network to perform operations comprising identifying an MME pool serving a UE associated with the relay node and receiving information identifying one or more MME pools supported by a handover target. The one or more MME pools supported by the handover target are compared to the MME pool serving the UE. If the handover target supports the MME pool serving the UE an X2 handover is initiated to handover the UE to the target. If the handover target does not support the MME pool serving the UE, An S1 handover is initiated to handover the UE to the target.

In another embodiment, the invention comprises a non-transitory computer readable medium storing a program of instructions. Execution of the program of instructions by at least one data processor of a relay node operating in an LTE wireless network causes operations comprising identifying an MME pool serving a UE associated with the relay node and receiving information identifying one or more MME pools supported by a handover target. The one or more MME pools supported by the handover target are compared to the MME pool serving the UE. If the handover target supports the MME pool serving the UE, an X2 handover is initiated to handover the UE to the target. if the handover target does not support the MME pool serving the UE, an S1 handover is initiated to handover the UE to the target.

According to another embodiment of the invention, an apparatus comprises a least one processor and memory storing computer program code. The memory and the computer program code are configured, with the at least one processor, to cause operations comprising sending a globally unique group identifier list to a device. The sending of the globally unique group identifier list to the device is performed upon one or more of initial association with the device or a configuration update for the device. If the device is a relay node associated with the apparatus, including in the globally unique group identifier list is a subset of MME pool identifiers associated with the apparatus. The MME pool identifiers included in the subset are chosen so as to exclude MME pool identifiers that are unsupported by one or more neighbor nodes of the device.

In another embodiment of the invention, an apparatus comprises at least one processor and a memory storing computer program code. The memory and the computer program code are configured, with the processor, to cause operations comprising identifying an MME pool serving a UE associated with the relay node and receiving information identifying one or more MME pools supported by a handover target. The one or more MME pools supported by the handover target are compared to the MME pool serving the UE. If the handover target supports the MME pool serving the UE, an X2 handover is initiated to handover the UE to the target. If the handover target does not support the MME pool serving the UE, an S1 handover is initiated to handover the UE to the target.

Further details of various embodiments of the invention are described below with particularity.

DETAILED DESCRIPTION

The present invention provides mechanisms that promote efficiency in handovers of UEs from one eNB to another when the eNB is being served by a relay node, from one relay node to another, and from a relay node to an eNB. In one architecture proposed for LTE release 10, referred to in 3GPP TR 36.806 V9.0.0 (2010-03) Technical Report 3rd Generation Partnership Project; Technical Specification Group Radio Access Network; Evolved Universal Terrestrial Radio Access (E-UTRA); Relay architectures for E-UTRA (LTE-Advanced) (Release 9), the DeNB functions as a proxy for both S1 and X2 signaling, effectively hiding the RN from the core network (CN). That is, from the CN point of view, the relayed UEs are connected directly to the DeNB, and the RN will appear as an ordinary cell within the DeNB. For the remainder of the description of the exemplary embodiments of this invention the use of such an architectural model is assumed.

Figure 2:
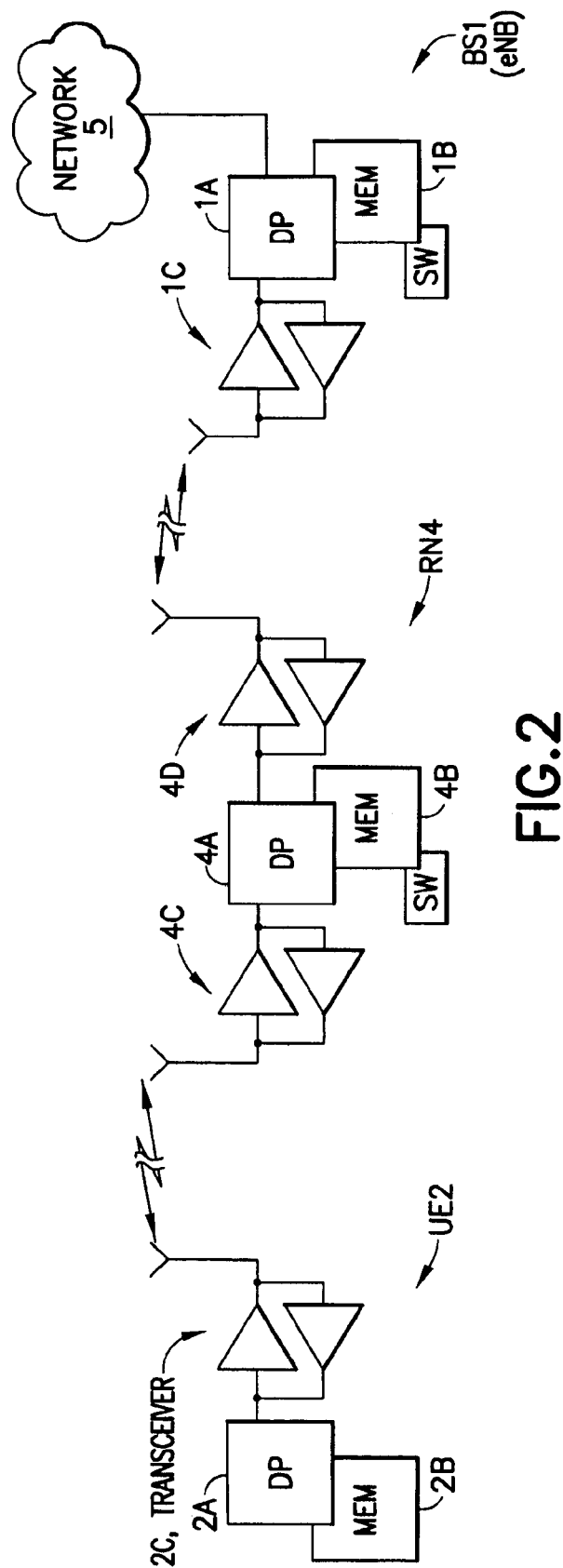
FIG. 2 illustrates a simplified block diagram of various electronic devices that are suitable for use in practicing one or more exemplary embodiments of the present invention.

FIG. 2 presents a simplified block diagram of various elements that can be used to implement exemplary embodiments of the present invention. FIG. 2 illustrates an exemplary UE 2, an exemplary RN 4 and an exemplary BS 1. The BS 1 may suitably be an eNB or DeNB, and may provide connectivity to a data communications network 5, which may suitably comprise the public Internet. The BS 1 may have access to one or more intermediary elements, such as a serving gateway, and may provide connectivity to the network 5 though the one or more intermediary elements.

The BS 1 may be viewed as a network access node. The BS 1 includes a controller, which may take the form of at least one data processor (DP) 1A. The data processor 1A may have access to a memory 1B, storing program instructions executable by the data processor 1A. The memory 1B may also store data and make this data accessible to the data processor 1A.

The base station 1 may also employ a transmitter and a receiver, illustrated here in the form of a transceiver 1C. The transmitter and the receiver of the base station 1 may be configured to support communication with a UE 2 or with a RN 4.

The RN 4 may also include a controller such as at least one data processor (DP) 4A, which may, similarly to the base station 1, have access to a memory 4B storing software and data. The RN 4 comprises at least one wireless transmitter and receiver, which may suitably be implemented as a transceiver 4C, and may include more than one wireless transmitter and more than one wireless receiver. The particular exemplary RN 4 illustrated here comprises two transceivers 4C and 4D. For example, the transceiver 4C may provide communication with one or more UEs, of which the UE 2 is an example, and the transceiver 4D may provide communication with the BS 1.

The UE may also comprise a controller such as at least one data processor (DP) 2A which may, similarly to the base station 1 and the RN 4, have access to a memory 2B storing software and data. The UE 2 comprises at least one wireless transmitter and receiver, such as the transmitter and receiver 2C and 2D, respectively, configured so as to provide bidirectional wireless communication with the RN 4, or directly with the BS 1.

At least a portion of the instructions stored in one or both of the memories 1B and 4B, when executed by the associated DP 1A or 1B, respectively, causes the electronic device in which the DP operates, that is, the base station 1 or the RN 4, to operate in accordance with the exemplary embodiments of the present invention, as discussed in greater detail below. One or more exemplary embodiments of the present invention may, alternatively or in addition, be implemented at least in part by hardware, or by a combination of software and hardware, with software, hardware, or both suitably taking the form of firmware. The extent to which embodiments of the invention are implemented by the use of, or employ, software, hardware, or firmware is a matter of design choice and choices may be made from numerous alternatives.

A UE such as the UE 2 may take the form of cellular phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions or other suitable functions.

The memories 1B, 2B and 4B may be of any type suitable to the local technical environment and may be implemented using any suitable data storage technology, such as semiconductor based memory devices, flash memory, magnetic memory devices and systems, optical memory devices and systems, fixed memory and removable memory. The DPs 1A, 2A and 4A may be of any type suitable to the local technical environment, and may include one or more of general purpose computers, special purpose computers, microprocessors, digital signal processors (DSPs) and processors based on multi-core processor architectures, as non-limiting examples.

Figure 1A:
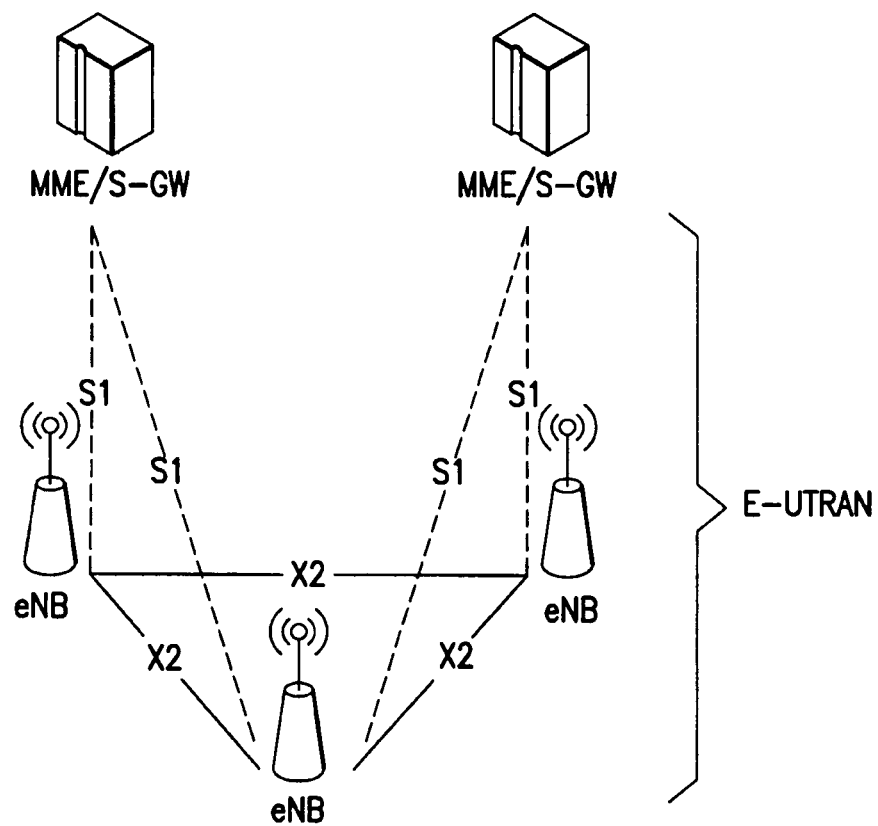
FIG. 1A reproduces Figure 4.1 of 3GPP TS 36.300, and shows the overall architecture of the EUTRAN system.
Figure 1B:
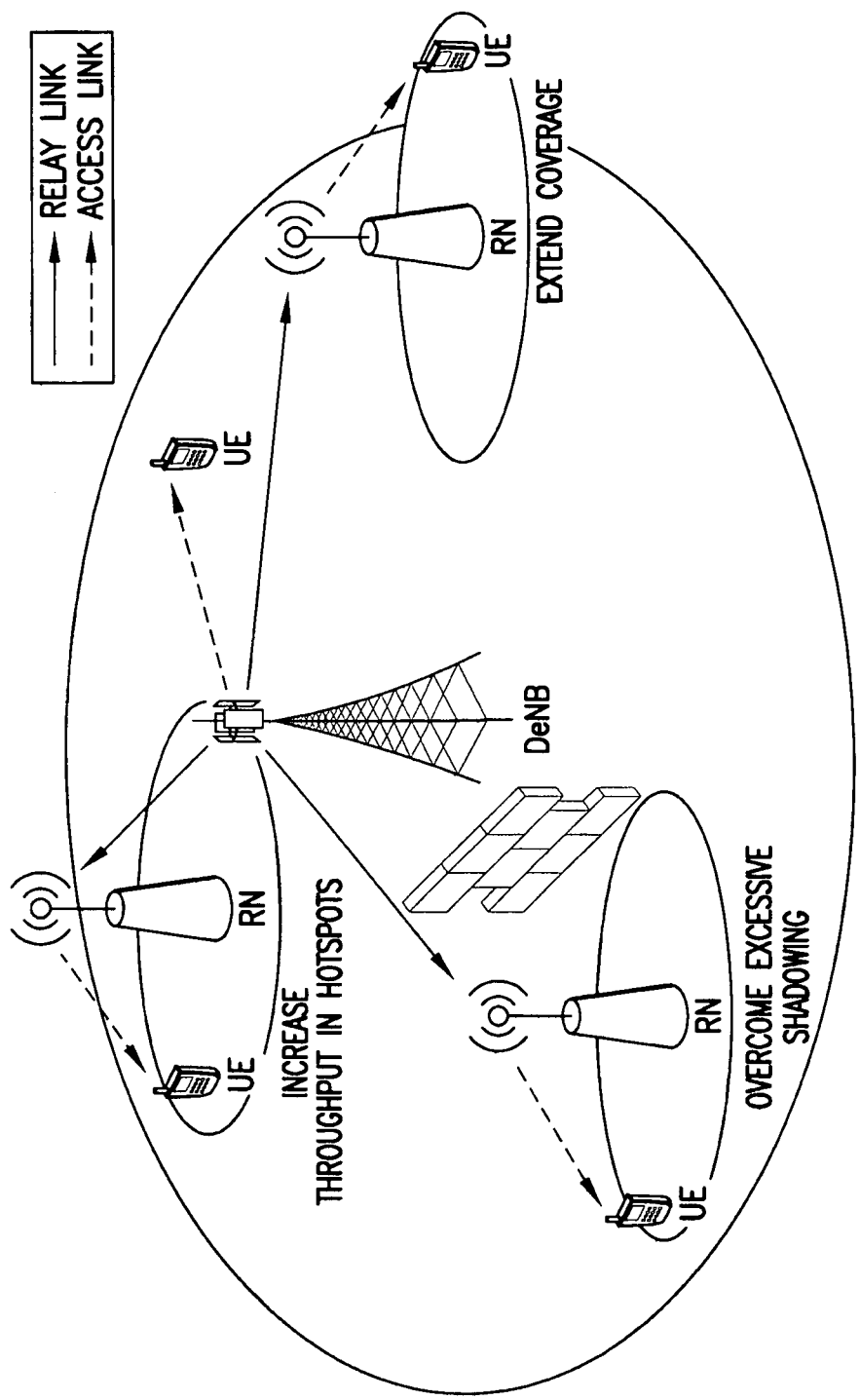
FIG. 1B illustrates an exemplary typical deployment scenario of an LTE RAN with possible radio relayed extensions.

A feature of the S1 interface of LTE is a so-called S1-flex. S1-flex allows multiple CN nodes, such as the Mobility Management Entity (MME) and the Serving Gateway (S-GW) shown in FIG. 1A, to serve a common geographical area and be connected by a mesh network to the set of eNBs in that area. The set of MME/SGW nodes that serve a common area can be called a MME/SGW pool. A MME pool area is defined as an area within which a UE 2 may be served without the need to change the serving MME. An MME pool area is served by one or more MMEs in parallel. The MMEs serving an area may be referred to as a "pool of MMEs."

MME pool areas are a collection of complete tracking areas, or TAs, and MME pool areas may overlap with one another. Reference in this regard can be made to 3GPP TS 23.401 V9.5.0 (2010-06) Technical Specification 3rd Generation Partnership Project; Technical Specification Group Services and System Aspects; General Packet Radio Service (GPRS) enhancements for Evolved Universal Terrestrial Radio Access Network (E-UTRAN) access (Release 9), incorporated by reference herein.

A globally unique ID known as the GU Group Id is assigned to each pool area. Reference in this regard can be made to 3GPP TS 36.423 V9.3.0 (2010-06) Technical Specification 3rd Generation Partnership Project; Technical Specification Group Radio Access Network; Evolved Universal Terrestrial Radio Access Network (E-UTRAN); X2 application protocol (X2AP) (Release 9), incorporated by reference herein.

The use of MME pools allows UEs in a given cell to be shared between multiple CN nodes, thereby providing a possibility for load balancing and elimination of single points of failure for the CN nodes. The eNB 1 and UEs such as the UE 2 may implement such sharing.

Figure 3:
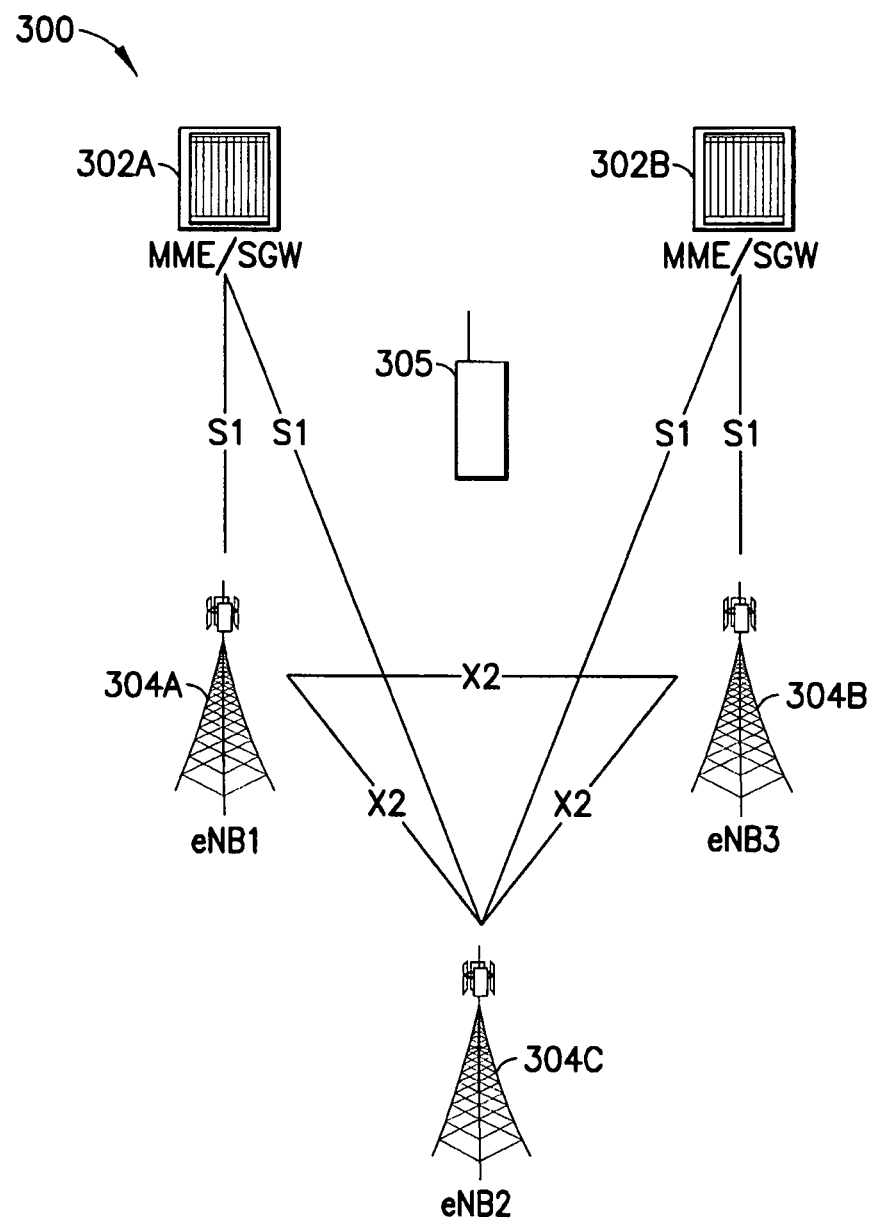
FIG. 3 illustrates an example of an LTE radio access network deployment with a fixed RN that may be operated according to one or more embodiments of the present invention.

An arrangement providing interconnections and communications that increase the ease of sharing of UEs is illustrated in FIG. 3. FIG. 3 illustrates MMEs 302A and 302B and eNBs 304A, 304B, and 304C, and it can be seen that the eNB 304B has an S1 connection to each of the MME/SGWs 302A and 302B.

S1 and X2 handover are two kinds of handover supported in LTE. According to LTE standards that have been developed, X2 handover should be performed whenever possible because the involvement with the CN required for X2 handover is minimal, and thus the use of X2 handover leads to shorter handover latency. However, even if an X2 connection between two eNBs exists, it might not be possible to perform an X2 handover. In implementation of the configuration illustrated in FIG. 3, the MMEs 302A and 302B might belong to two different pools. A UE 305 might be served by the eNodeB 304B, while the MME pool including the MME/SGW 302B might be chosen to serve the UE 305.

If the UE 305 is to be handed over to the eNB 304A, an X2 handover will fail because the eNodeB 304A is connected only to the MME pool of which the MME/SGW 302A is a member, and X2 handover presupposes that the MME is not changed during the handover. If an X2 handover request is sent from the eNB 304B to the eNB 304A, the eNB 304A will detect that the UE belongs to a MME pool that is not supported by the eNB 304A and will respond with a handover preparation failure message that includes an "Invalid MME Group ID" failure cause. Upon receiving this message, the eNB 305 will recognize that X2 handover is not possible and will attempt an S1 handover instead (as specified in 3GPP TS 36.423 V9.3.0).

Figure 4:
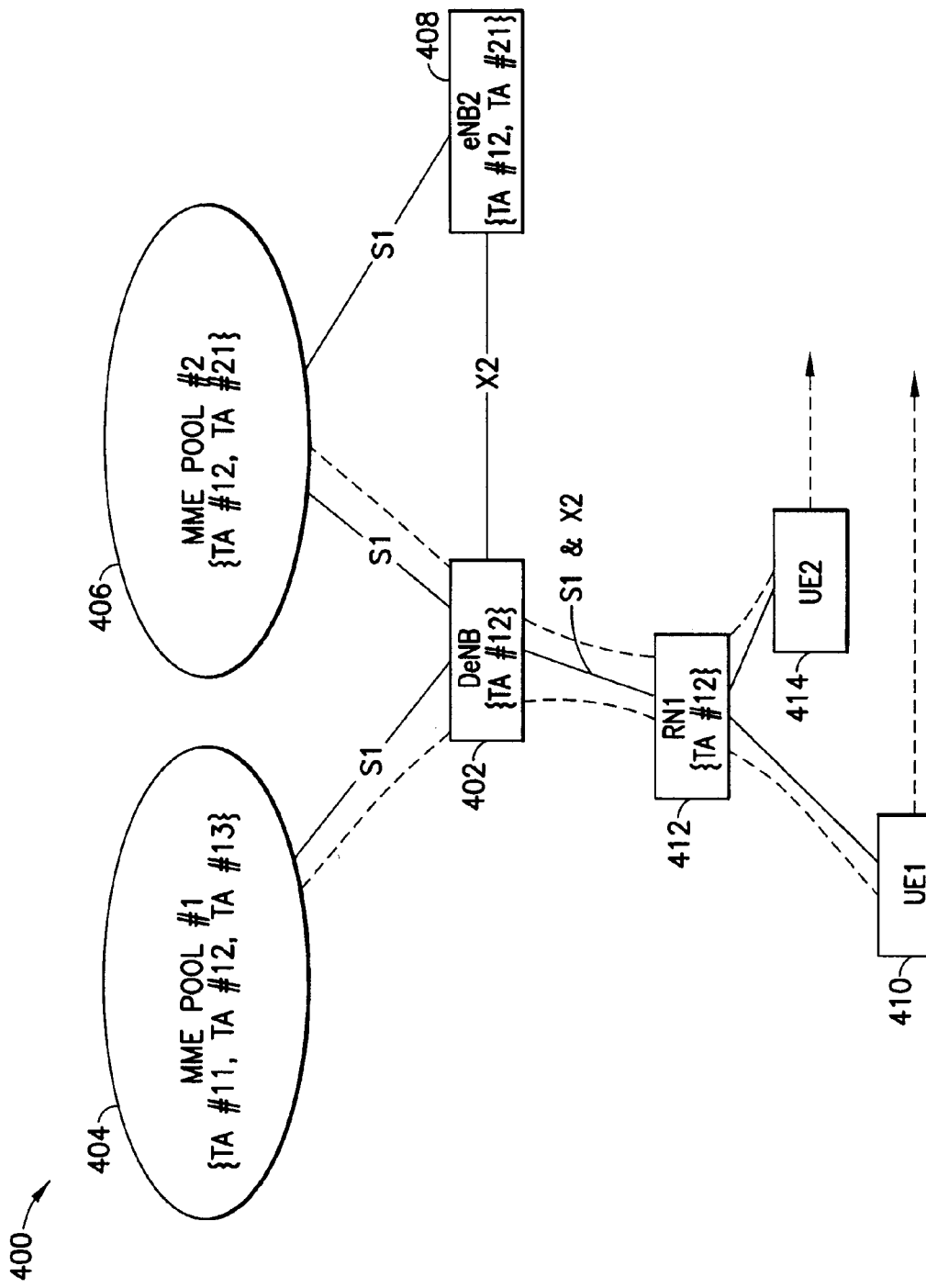
FIG. 4 illustrates an exemplary deployment scenario illustrating a problem with GU group ID.

It has been agreed that RNs should support X2 handover, with the help of their DeNB that facilitates the X2 proxying, as specified in 3GPP TR 36.913, V9.0.0. However, release 8 of the 3GPP standard specifies a relaying architecture configured in such a way that the identity of the MME supporting a particular UE is hidden from the RN. Thus, the MME pool mismatch problem can be hidden from the RN. Embodiments of the present invention, therefore, FIG. 4 illustrates a configuration 400 in which an MME pool mismatch can be invisible to the RN, and in which embodiments of the present invention can be used to advantage to minimize inefficiencies that can result from such invisibility. It will be seen that the DeNB 402 connects to the MME pool 404 and the MME pool 406, and that the neighboring eNB 408 connects only to the MME pool 406. When a UE 410 attaches to the RN 412, the DeNB 402 performs MME selection. The DeNB 402 is free to select an MME from the MME pool 404 or the MME pool 406, because both pools support the Tracking Area (TA) #12 to which the DeNB 402 also belongs. The eNodeB 408 and the RN 412 also support the tracking area #12.

Suppose, then, that the MME pools 404 and 406 have been selected for the UEs 410 and 414, respectively, and a handover attempt is made to handover both the UE 412 and the UE 414 from the DeNB 402 to the eNB 408. In such a case, an X2 handover will succeed for the UE 414, but only an S1 handover will succeed in the case of the UE 410.

However, the RN 412 is unaware of which MME pool is serving the attached UEs 410 and 414, and thus it cannot correctly decide whether to initiate S1 or X2 handover. If the RN 410 simply assumes X2 handover is possible and attempts an X2 handover, the handover preparation failure rate can be expected to be excessive. If UEs are more or less evenly distributed through the MME pools 404 and 406, then on average as many as 50% of the X2 handover attempts from the DenB 402 to the eNB 408 could fail. In such a scenario, waste of radio and core network resources will occur in 50% of handover attempts as an X2 handover is made and fails, and then an S1 handover is attempted. Also, the handover delay is increased due to the time taken for the failed initial X2 handover attempt. On the other hand, if only S1 handover is used, the handover will succeed, but the performance improvement that would have been gained by using the X2 handover will be lost in those case in which it can be achieved but is not attempted.

Exemplary embodiments of the present invention provide a simple and backward compatible solution that still preserves the logic of the relaying architecture selected for 3GPP release 10. Embodiments of the invention address problems relating to the ambiguity that interferes with the resolution by an RN, such as the RN 412, of the ambiguity affecting its determination of whether an X2 handover is supported for a particular one of the UEs it is currently serving. This ambiguity exists because, as noted above, an RN does not have information identifying the MMEs to which its UEs are connected In accordance with exemplary embodiments of this invention, this problem can be resolved in the following manner, still dealing with the configuration illustrated in FIG. 4. It can be seen that the DeNB 402 is connected to multiple MME pools, namely, the MME pools 404 and 406. The DeNB 402 therefore selects only one MME pool for all the UEs that are connected via a particular RN. In the present illustrated case, these are the UE 410 and 414, connected through the RN 412. With this approach, the X2 handover to a particular target eNB, such as the eNB 408, is supported either for all the UEs of the RN or for none.

Embodiments of the present invention recognize that in order to avoid a trial and error approach to performing of an X2 handover, the RN will benefit from knowledge of whether or not an X2 handover is supported or not with a particular target node, and that the eNBs include capabilities for sending information from which such knowledge can be obtained.

Consider again the configuration illustrated in FIG. 4. When two eNBs set up an X2 interface between them, they are able to communicate the globally unique group ID of the MME pools with which they are connected. An eNB can also send a configuration update to notify a peer node when a new pool is added or when a previous pool is no longer supported. Thus, the eNB 408 will send to the DeNB 402 an indication that it supports the MME pool 406. During an initial attach procedure of an RN, a DeNB responding to an attach request and setting up a connection communicates relevant information, including MME pool information.

According to one or more embodiments of the invention, therefore, a DeNB such as the DeNB 402, when conducting a setup procedure to allow attachment by an RN, selects an MME pool to be used for the RN and communicates only the globally unique group ID of the MME pool that it has determined to use for the RN. This is done whether or not the DeNB has connections with more than one MME pool. In an exemplary embodiment of the invention, therefore, the RN 412 requests attachment and the DeNB 402 carries out the initial setup process, indicating that the MME pool to be used is the MME pool 404.

Suppose, then, that the RN 412 seeks to establish a connection with the eNB 408, which is a neighbor node to the DeNB 402. In the illustrated example, an X2 connection between the DeNB 402 and the eNB 408 is present, but cases in which no X2 connection exists, an X2 connection will be set up when the RN 412 seeks to establish a connection with the new node. The DeNB 402 sends an eNB configuration update to the RN 408, signifying that a proper X2 connection is being set up, or, as in the illustrated example, already exists. At this time the DeNB 402 can include in the configuration update the globally unique group ID list indicating the MME pools supported by the neighbor node. In the illustrated case, this is the MME pool 406. The RN 412 will understand based on the group ID list delivered during the configuration update whether or not an X2 handover is possible. In the present case, the eNB 408 does not support the MME pool 404 that was selected for the RN 412 by the DeNB 402, and whose ID was sent to the RN 412 during the attach procedure. Therefore, the RN 412 will attempt only an S1 handover rather than an X2 handover because the eNB 408 does not support the MME pool 404.

In addition, an RN can be kept updated with the identifiers of MME pools supported by a neighbor eNB as an eNB adds or removes MME pools. Thus, if the eNB 408 adds or removes an MME pool, this fact can be communicated to the DeNB 402, and the DeNB 402 can then forward the information to the RN 412. Suppose that the eNB 408 adds the MME pool 404. This information will be conveyed to the RN 412, and the RN 412 will recognize that it is capable of carrying out an X2 handover to the eNB 408.

A further performance enhancement can be gained by using intelligent mechanisms to select an MME pool to which an RN should belong. For example, the DeNB 402 can determine what percentage of the neighbors of the RN 412 belong to the MME pool 404, or the MME pool 406, and can decide from which pool to select the MMEs for newly incoming UEs. This may be more difficult at the beginning, as some UEs have to be connected to the RN 412 to obtain sufficient neighbor information. However, when the RN 412 is being attached to the DeNB 402 during initial startup, it may first operate as a UE for a short duration before switching to RN mode, and during this period it can attempt to detect its neighboring cells. When the RN 412 begins X2 setup with its DeNB 402, the RN 412 can identify for the DeNB 402 the cells it has detected. This may be accomplished either in the X2 setup request or the X2 setup response, depending on whether the DeNB 402 or the RN 412 initiates the X2 setup procedure. The relevant messages can provide this information can be prepared before hand and stored by either the DeNB 402, the RN 412, or both.

The DeNB 402 can then determine the "majority" MME pool to which the neighbors of the RN belong, and then determine that this MME pool is to be used for the UEs of the RN 12. In the present case, the neighbor of the RN 412 is the eNB 408, so that under this procedure, the DeNB 402 will select the MME 406 for the RN 412.

As activity is conducted involving the RN 412, and UEs communicating through the RN 412 have been connected and terminated, the information as to which MME is used by the UEs improves, so that the DeNB 402 will progressively obtain more accurate information about the "majority" MME pool. In cases in which the RN 412 is not loaded or is lightly loaded, the DeNB 402 may attempt to switch the "majority" MME pool for RN 412 if needed. It is understood that such a process may result in a need for MME relocation being needed for some UEs, but it will be recognized that this can be accomplished using already standardized MME relocation procedures that are used for load balancing.

As noted above, when setting up an X2 with an RN such as the RN 412, the DeNB 402 may suitably send only one relevant GU group ID, as opposed to sending an entire list of GU group IDs that it would send to its other eNB neighbors. The RN 412 on the other hand, compares the GU group ID of the DeNB 402 with the GU group ID list received from a neighbor such as the eNB 408 to determine if an X2 handover can be supported. In one exemplary embodiment of the invention, these operations can be implemented using software stored in memory.

It will be recognized that an MME pool typically includes multiple MMEs, so that embodiments of the present invention allow for load balancing between MMEs within a selected MME pool for a given RN, such as the RN 412. In addition, load balancing between different MME pools can be achieved through, for example, the relocation of all of the UEs of an RN to a different MME pool. In the frequently encountered case in which the load on an RN is not particularly great, the impact on overall load balancing performance of restricting an RN to a single MME pool can be expected to be relatively modest in many cases. It will be further recognized that a single UE is unlikely to cause an overload for a MME that can support hundreds of UEs so that relocation sets of UEs, which can be accomplished, for example, through the relocation of an RN from one MME pool to another or through the relocation of UEs from one RN to another, is possible even when each RN is restricted to a single MME pool.

It will be further recognized that a DeNB, such as the DeNB 402, by appropriately choosing MME pools to be associated with various RNs, can maximize the load balancing afforded by an MME pool to which a particular RN is assigned, and a DeNB is also able to perform load balancing as needed in the case of UEs being directly served by the DeNB.

As noted above, RN neighbor discovery can be used during initial startup, and alternatively or in addition, neighbor discovery can be achieved by a relayed UE to identify an optimum MME pool to select for an RN. A further alternative is for a DeNB to assume that the potential handover candidates for a certain RN are its other RNs and also possibly those RNs under neighboring DeNBs. This potential candidate set can be limited as desired. For example, a set of handover candidates may be limited, for example, to RNs that already have a neighbor relation with a serving DeNB of a connecting RN, to those RNs that already have a neighbor relation with the serving DeNB of the connecting RN, or to RNs that connect to another DeNB but also have a neighbor relation to another RN of the serving DeNB. An RN that is not adjacent to the serving DeNB, nor to any of its RNs, is less likely to be a neighbor of the new RN.

Another simplifying approach is to designate a single MME pool to serve all RNs of a given DeNB. Under this approach, any RN served by the DeNB is capable of accepting an X2 handover from any other RN of the DeNB. Such an approach can prove advantageous in appropriate cases, but consideration should be made possible decreases in load balancing flexibility, especially in dense deployments where the number of RNs per DeNB is high.

It will be remembered that when an X2 connection is set up between an RN and a DeNB during an initial RN attach procedure, such as between the RN 412 and the DeNB 402, the DeNB 402 can reply with the list of neighbors with which the DeNB 402 already has X2 connections. In one embodiment of the invention, an RN, such as the RN 412, uses experience to improve its understanding of which neighbors can accept an X2 handover. For example, the RN 412 may assume that an X2 handover to these reported neighbors is possible. However, if some of these neighbors are using MME pools different from the one assigned to be used for the RN, an X2 handover request can lead to a failure. Thus, if the RN attempts to carry out an X2 handover to a particular DeNB and fails, the failure can be recognized and failure information can be stored. The RN therefore restricts itself to S1 handovers for each DeNB for which an X2 handover attempt has previously failed, until an eNB configuration update is received concerning this neighbor that includes the MME pool that is originally reported by the DeNB.

It will also be recognized that if all neighboring cells of an RN support two or more MME pools it is possible to assign more than a single MME pool to the RN. The RN can be assigned all the MME pools shared in common by all of its neighboring cells. In such a case, an X2 handover is always possible to neighbors that support all pools, so that an RN does not need to know the MME pool of a UE it needs to handover. Such an approach may be particularly advantageous in cases in which a single MME pool is split into two MME pools, because DeNBs that were previously associated with the previous MME pool will still be associated with both of the new MME pools resulting from the split.

Figure 5:
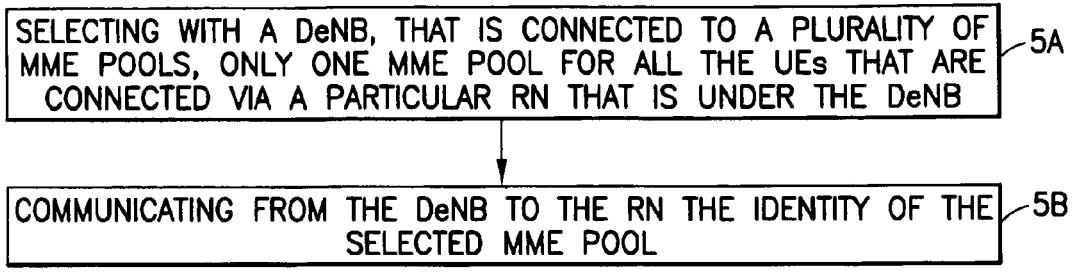
FIG. 5 illustrates a process according to an embodiment of the present invention.

FIG. 5 is a logic flow diagram that illustrates the operation of a method, and a result of execution of computer program instructions, in accordance with the exemplary embodiments of this invention. In accordance with these exemplary embodiments a method performs, at Block 5A, a step of a DeNB, that is connected to a plurality of MME pools, selecting only one MME pool for all the UEs that are connected via a particular RN that is under the DeNB. At Block 5B there is a step of communicating from the DeNB to the RN the identity of the selected MME pool. This step of communicating may be performed via standard X2 setup/update procedures.

Figure 6:
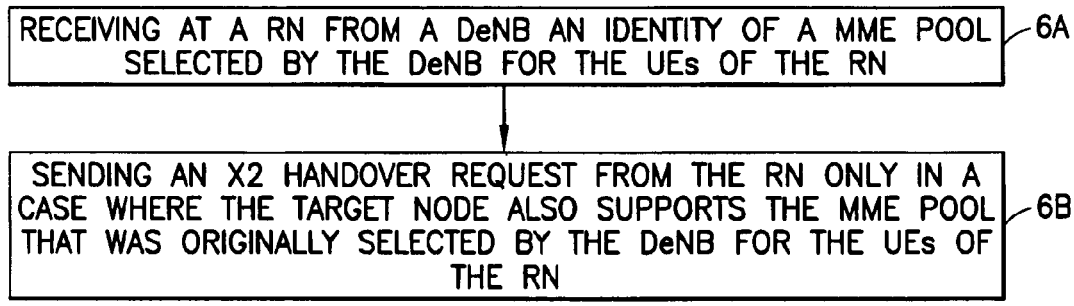
FIG. 6 illustrates a process according to an alternative embodiment of the present invention.

FIG. 6 is a logic flow diagram that illustrates the operation of a method, and a result of execution of computer program instructions, further in accordance with the exemplary embodiments of this invention. In accordance with these exemplary embodiments a method performs, at Block 6A, a step of receiving at a RN from a DeNB an identity of a MME pool selected by the DeNB for the UEs of the RN. At Block 6B there is a step of sending an X2 handover request from the RN only in a case where the target node also supports the MME pool that was originally selected by the DeNB for the UEs of the RN, otherwise an S1 handover is initiated.

The various blocks shown in FIGS. 5 and 6 may be viewed as method steps, and/or as operations that result from operation of computer program code, and/or as a plurality of coupled logic circuit elements constructed to carry out the associated function(s).

Figure 7:
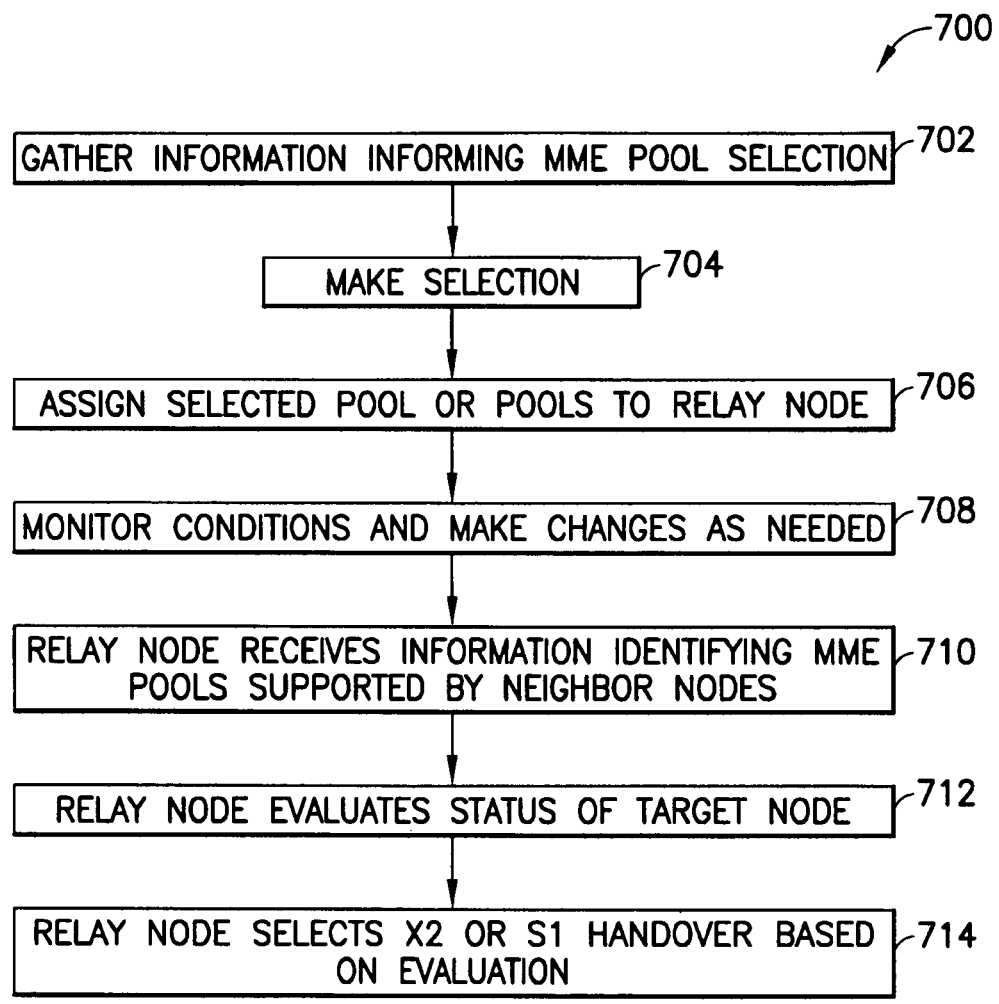
FIG. 7 illustrates a process according to an alternative embodiment of the invention.

FIG. 7 illustrates a process 700 according to an embodiment of the present invention. The process may suitably be implemented using elements such as those illustrated in FIGS. 2-4 or other suitable elements. At step 702, information is gathered to inform a selection of one or more MME pools for assignment to a relay node. Assignment of an MME pool or a group of MME pools to a relay node will result in the assignment of the MME pool or pools to all UEs supported by the relay node. The selection may be conducted by a base station, such as a DeNB, serving the relay node. The DeNB may support a number of MME pools, but selects a subset of the MME pools for assignment to the relay node. Under some conditions, however, the subset of MME pools assigned to the relay node may constitute the entire set of MME pools supported by the DeNB. The selection is suitably made in such a way as to prevent the relay node from attempting an X2 handover to a node that does not support an MME pool serving the UE for which the handover is to be made. For example, the DeNB may assign a single MME pool to the relay node. Depending on the circumstances, however, the DeNB may assign more than one MME pool to the relay node.

Therefore, the DeNB may use one of a number of alternative exemplary mechanisms to inform the selection. For example, the DeNB may identify an MME pool to which most neighbors of the relay node belong, and can therefore select this majority MME pool. If all neighbors of the relay node belong to more than two MME pools, then both MME pools can be assigned to the relay node, and any neighbor to which a handover is made will of necessity support an MME pool serving the UE being handed over. To take another example, the DeNB may progressively obtain better and better information as to the MME pools used by neighbor nodes to which handovers of UEs are performed. To take still another example, load balancing considerations can be used to inform the selection. Numerous other additional and alternative mechanisms for gathering information may be used, such as various mechanisms described above.

At step 704, one or more MME pools are selected for assignment to the relay node. At step 706, the one or more selected MME pools are assigned to the relay node At step 708, the DeNB continues to monitor conditions and make changes as needed. For example, the DeNB may communicate with other nodes to recognize changes to the MME pools being used by the neighbor nodes. As needed, the DeNB changes the assignment to the relay node based on newly gathered information.

At step 710, the relay node receives information identifying MME pools served by neighboring nodes. At step 712, when the relay node needs to perform a handover, it evaluates the status of target node, that is, the node to which the handover is to be made, to determine if the target node supports the pool or pools assigned to the relay node. At step 714, the relay node initiates an X2 or an S1 handover depending on whether the target node supports the pool or pools assigned to the relay node.

In one embodiment of the invention, the evaluation conducted at step 712 may be informed by experience. In some circumstances, the relay node may not have definitive information as to whether the target node supports the relay node's assigned MME pools. In such cases, the relay node may attempt an X2 handover, and store the result if the handover attempt fails. In future handovers, the failure of a handover attempt to a particular target node will be recognized as indicating that a subsequent handover attempt to that target node should not be attempted, until information indicating changed circumstances is received.

As noted above, the relay node can be made informed of which MME pools are supported by neighbor nodes and can choose whether to conduct an X2 or an S1 handover based on whether a target node supports an MME assigned to the relay node.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the UTRAN LTE and LTE-A systems, it should be appreciated that the exemplary embodiments of this invention are not limited for use with only these particular types of wireless communication systems, and that they may be used to advantage in other wireless communication systems.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described network elements, parameters and information elements (e.g., MME, DeNB, GUMMEI, etc.) are not intended to be limiting in any respect, as these network elements, parameters and information elements may be identified by any suitable names. Further, the various names assigned to different interfaces (e.g., X2, S1) are not intended to be limiting in any respect, as these various interfaces may be identified by any suitable names.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

We claim:

1. A method comprising:
   configuring a base station to perform operations comprising:
   sending a globally unique group identifier list to a device;
   wherein sending the globally unique group identifier list to the device is performed upon one or more of initial association with the device or a configuration update for the device; and
   wherein sending of the globally unique group identifier list comprises, if the device is a relay node associated with the base station, including in the globally unique group identifier list a subset of mobility management entity pool identifiers associated with the base station, wherein the mobility management entity pool identifiers included in the subset are chosen so as to exclude mobility management entity pool identifiers that are unsupported by one or more neighbor nodes of the device.

2. The method of claim 1, wherein sending a globally unique group identifier list to a relay node further comprises assigning the one or more mobility management entity pools to all user equipments served by the relay node.

3. The method of claim 1, wherein the globally unique group identifier list for a relay node is sent to the relay node upon initial attachment by the relay node to the apparatus.

4. The method of claim 1, wherein the subset of mobility management entity pools selected for a relay node comprises a single mobility management entity pool.

5. The method of claim 1, wherein the subset of mobility management entity pools selected for a relay node comprises all mobility management entity pools meeting the condition that the mobility management entity pool is supported by all neighboring cells of the relay node.

6. The method of claim 1, wherein the operations further comprise, upon establishing a connection with a neighbor node, sending a configuration update to the relay node comprising a globally unique group identifier list identifying one or more mobility management entity pools supported by the neighbor node.

7. The method of claim 6, wherein the operations further comprise responding to a change in the one or more mobility management entity pools supported by a neighbor node to send a configuration update to the relay node to report the change.

8. The method of claim 1, wherein the operations further comprise causing the base station to assign one or more mobility management entity pools to the relay node based on information indicating which mobility management entity pools are supported by neighbors of the relay node.

9. The method of claim 7, wherein the operations further comprise:
   assigning a new mobility management entity pool to user equipments being served by the relay node; and
   performing a mobility management entity relocation procedure for UEs not currently assigned to the new MME pool.

10. The method of claim 1, wherein the operations further comprise:
    receiving from the relay node information specifying one or more mobility management entity pools supported by neighbors of the relay node; and
    assigning one or more mobility management entity pools to the relay node based on the information received from the relay node.

11. The method of claim 1, wherein the operations further comprise:
    configuring a relay node operating in a long term evolution wireless network to perform operations comprising:
    identifying a mobility management entity pool serving a user equipment associated with the relay node
    receiving information identifying one or more mobility management entity pools supported by a handover target;
    comparing the one or more mobility management entity pools supported by the handover target to the MME pool serving the UE;
    if the handover target supports the immobility management entity pool serving the user equipment, initiating an X2 handover to handover the user equipment to the target; and
    if the handover target does not support the mobility management entity pool serving the user equipment, initiating an S1 handover to handover the user equipment to the target.

12. An apparatus comprising:
    a least one processor;
    memory storing computer program code;

wherein the memory and the computer program code are configured, with the at least one processor, to cause operations comprising:

controlling a base station to send a globally unique group identifier list to a device;

wherein sending the globally unique group identifier list to the device is performed upon one or more of initial association with the device or a configuration update for the device; and wherein sending of the globally unique group identifier list comprises, if the device is a relay node associated with the base station, including in the globally unique group identifier list a subset of mobility management entity pool identifiers associated with the base station, wherein the MME pool identifiers included in the subset are chosen so as to exclude mobility management entity pool identifiers that are unsupported by one or more neighbor nodes of the device.

13. The apparatus of claim 12, wherein sending a globally unique group identifier list to a relay node further comprises assigning the one or more mobility management entity pools to all user equipments served by the relay node.

14. The apparatus of claim 12, wherein the subset of mobility management entity pools selected for a relay node comprises a single mobility management entity pool.

15. The apparatus of claim 12, wherein the subset of mobility management entity pools selected for a relay node comprises all mobility management entity pools meeting the condition that the mobility management entity pool is supported by all neighboring cells of the relay node.

16. The apparatus of claim 12, wherein the operations further comprise, upon establishing a connection with a neighbor node, sending a configuration update to the relay node comprising a globally unique group identifier list identifying one or more mobility management entity pools supported by the neighbor node.

17. The apparatus of claim 12, wherein the operations further comprise:

causing the base station to assign one or more mobility management entity pools to the relay node based on information indicating which mobility management entity pools are supported by neighbors of the relay node;

assigning a new mobility management entity pool to user equipments being served by the relay node; and performing a mobility management entity relocation procedure for UEs not currently assigned to the new MME pool.

18. The apparatus of claim 12, wherein the operations further comprise:

receiving from the relay node information specifying one or more mobility management entity pools supported by neighbors of the relay node; and assigning one or more mobility management entity pools to the relay node based on the information received from the relay node.

19. The apparatus of claim 12, wherein the operations further comprise:

configuring a relay node operating in a long term evolution wireless network to perform operations comprising:

identifying a mobility management entity pool serving a user equipment associated with the relay node receiving information identifying one or more mobility management entity pools supported by a handover target;

comparing the one or more mobility management entity pools supported by the handover target to the MME pool serving the UE;

if the handover target supports the mobility management entity pool serving the user equipment, initiating an X2 handover to handover the user equipment to the target; and if the handover target does not support the mobility management entity pool serving the user equipment, initiating an S1 handover to handover the user equipment to the target.

20. A computer program product comprising a non-transitory computer-readable storage medium bearing computer program code embodied therein for use with a computer, the computer program code comprising:

code for configuring—a base station to perform operations, the configuring comprising:

sending a globally unique group identifier list to a device;

wherein sending the globally unique group identifier list to the device is performed upon one or more of initial association with the device or a configuration update for the device; and wherein sending of the globally unique group identifier list comprises, if the device is a relay node associated with the base station, including in the globally unique group identifier list a subset of mobility management entity pool identifiers associated with the base station, wherein the mobility management entity pool identifiers included in the subset are chosen so as to exclude mobility management entity pool identifiers that are unsupported by one or more neighbor nodes of the device.

\* \* \* \* \*